US 6,598,891 B2

(12) United States Patent
Sakai

(10) Patent No.: US 6,598,891 B2
(45) Date of Patent: Jul. 29, 2003

(54) SUSPENSION FOR A FOUR-WHEELED VEHICLE

(75) Inventor: Kouji Sakai, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 61 days.

(21) Appl. No.: 09/683,056

(22) Filed: Nov. 13, 2001

(65) Prior Publication Data
US 2002/0070522 A1 Jun. 13, 2002

(30) Foreign Application Priority Data
Dec. 6, 2000 (JP) ........................ 2000-370915

(51) Int. Cl.$^7$ ..................... B60G 21/067; B60G 21/073
(52) U.S. Cl. ..................... 280/124.161; 280/5.507; 280/124.104; 280/124.106; 280/124.157; 60/413
(58) Field of Search ............... 280/5.507, 5.508, 280/5.509, 5.513, 5.519, 124.106, 124.104, 124.157, 124.16, 124.161; 60/413, 415, 469; B60G 21/067, 21/073

(56) References Cited

U.S. PATENT DOCUMENTS

| 2,184,202 A | * | 12/1939 | Tschanz | 280/5.506 |
| 5,486,018 A | * | 1/1996 | Sakai | 280/124.16 |
| 6,024,366 A | * | 2/2000 | Masamura | 280/124.162 |
| 6,270,098 B1 | * | 8/2001 | Heyring et al. | 280/124.161 |

FOREIGN PATENT DOCUMENTS

| WO | WO 00/18597 A1 | * | 4/2000 |
| WO | WO 00/61393 A1 | * | 10/2000 |

* cited by examiner

Primary Examiner—Paul N. Dickson
Assistant Examiner—Ruth Ilan
(74) Attorney, Agent, or Firm—Ernest A Beutler

(57) ABSTRACT

A number of embodiments of four-wheeled vehicle suspension systems have interrelated front and rear shock absorbers so as to provide good control under normal suspension travel as well as resistance toward leaning, pitching, diving and squatting. In each embodiment, the normal fluid dampers having only a single shock absorber valve therein are interrelated with pressure controls that comprise four hydraulic cylinder portions which communicate with each other through various paired arrangements so as to provide this control and simplification of damping.

25 Claims, 7 Drawing Sheets

SUSPENSION FOR A FOUR-WHEELED VEHICLE

BACKGROUND OF INVENTION

This invention relates to a suspension system for a four-wheeled vehicle and more particularly to an improved, simplified and more effective suspension system for controlling all running conditions, which the vehicle encounters.

An arrangement has been proposed for suspending four-wheeled vehicles that employs individual shock absorbers at each wheel which have a relatively simple damping arrangement in them. However, the shock absorbers of paired wheels are coupled together with a pressure control mechanism that provides additional damping under certain characteristics. This type of system is show in Japanese Published Application. Hei 06-72127 and in its United States equivalent, U.S. Pat. No. 5,486,018, entitled "SUSPENSION SYSTEM FOR FOUR-WHEELED VEHICLES" issued Jan. 23, 1996 and the assigned to the assignee hereof. That patent shows a number of arrangements of such inter-related suspension systems. One that shows considerable sophistication appears in FIG. 13 of that U.S. patent and is reproduced here a FIG. 1. The details of the interrelationship between the various shock absorbers and the control arrangement is shown in more detail in FIG. 2.

As shown therein, there are four shock absorbers indicated at 11LF, 11RF, 11LR and 11RR comprising the cushioning units associated with the four wheels of the vehicle at its corners. Each of the shock absorbers 11 is mounted between the wheel suspension system and the vehicle body in a manner, which will be generally described, as will the individual construction of each shock absorber 11, which are identical.

Each shock absorber 11 includes a body portion 12 that defines a cylinder bore in which a piston 13 is supported. The piston 13 divides the cylinder bore into an upper chamber 14 and a lower chamber 115. A piston rod 16 extends through the upper chamber 14 and has a trunion 17 for attachment to the wheel suspension system or the vehicle body. A trunion 18 on the cylinder 12 accommodates the other connection.

A passageway 19 extends between the chambers 14 and 15 and has an orifice 21 for providing individual wheel damping control.

The individual shock absorbers 11 are interconnected with each other by means of an interconnecting control arrangement, indicated generally by the reference numeral 22. This control arrangement 22 includes individual passageways 23, 24, 25 and 26, which interconnect the chambers 15 of the shock absorber 11LF, 11RF, 11LR and 11RR with a pressure control, indicated generally by the reference numeral 27.

This pressure control 27 is shown in more detail in FIG. 2 and includes a body 28 in which four cylinder bores 29, 31, 32 and 33 are formed. Pistons 34, 35, 36 and 37 reciprocate in the cylinder bores 29, 31, 32 and 33, respectively. These pistons 34, 35, 36 and 37 are all connected for simultaneous movement by means of a bridging member 38, which extends into a pressurized gas chamber 39. This chamber 39 is pressurized to a suitable pressure with an inert gas such as nitrogen.

Thus, each shock absorber chamber 15 is in communication with a respective one of pressure control volumes 41, 42, 43 and 44 formed in the control body 28 between the pistons 34, 35, 36 and 37 and the cylinder bores 29, 31, 32 and 33, respectively.

Certain of the shock absorber chambers 15 are paired with each other via communicating passageways 45, 46 and 47 which connect the control pressure chambers 41 and 42, 42 and 43, and 43 and 44 together. Flow controlling orifices 48, 49 and 51 are positioned in the passages 45, 46 and 47, respectively.

When each wheel encounters the same obstacle at substantially the same time, each piston 13 will move in its respective shock absorber 11 to decrease the volume in the chamber 15. This motion is dampened by the flow through the orifice 21 into the chamber 14. However, since the piston rod 16 extends into the chamber 14 and displaces some of its volume, more fluid is expelled through the conduits 23, 24, 25 and 26 than the chambers 14 can accommodate. This excess displaced fluid flows to the chambers 41, 42, 43 and 44, respectively. Since equal volume of fluid is displaced from each shock absorber 11, the pistons 34, 35, 36 and 37 will move uniformly and the control device 27 will provide no additional damping.

If, however, there is a pitching motion, which tends to cause the vehicle weight to shift to the front, there will be more compression in the chambers 15 and 16 of the shock absorbers 11LF and 11RF than in the shock absorbers 11LR and 11RR. In fact, these shock absorbers will tend to move in the opposite direction. When this occurs, flow will pass through the orifices 48 and 51 from the chambers 41 and 44 into the chambers 42 and 43, respectively. Hence, this will provide damping from the pitching action, which might otherwise occur in addition to the damping provided by the individual shock absorbers 11.

In a similar manner, if the vehicle is rounding a curve which tends to cause the body to roll to the right i.e. when making a left-had turn, fluid will flow from the shock absorber 11LR to the shock absorber 11RR through the orifice 49 so to resist roll. However, there is no such roll resistance provided at the front and thus, it is very difficult to set the arrangement for overall damping to suit all conditions.

It is, therefore, a principal object to this invention to provide an improved shock absorber and suspension arrangement for a four-wheeled vehicle that will provide good damping for individual wheel suspension travels and also so as to preclude roll and pitch in all directions.

It a further object to this invention to provide an improved and simplified suspension system of this type and that will achieve these results.

SUMMARY OF INVENTION

A first feature of this invention is adapted to be embodied in a suspension system for a vehicle having at least four wheels, each of which is supported for suspension movement by a vehicle body. Each of four damping elements, each having a pair of relatively moveable members defining a respective first chamber, are interposed between a respective one of the wheels and the vehicle body for varying the volume of the first fluid chamber upon suspension movement of the respective one wheel. Each of the damping elements has a respective damping arrangement for damping the flow of fluid from the respective one of the first fluid chambers. A first conduit interconnects a first pair of the first fluid chambers of two of the damping elements and a first control arrangement is provided for precluding fluid flow through the first conduit in response to a first suspension condition and for providing a damped flow through the first conduit in response to a second suspension condition. A second conduit interconnects the second pair of the first fluid chambers of the remaining two of the damping units. A second control arrangement is provided in the second conduit for precluding fluid flow through the second conduit in response to a first suspension condition and for providing a damp flow through the second conduit in response to a second condition. A third conduit interconnects a third pair of the first fluid chambers other than those paired by the first and second conduits. A third control arrangement is provided in the third conduit for precluding fluid flow through the third conduit in response to a first suspension condition and for providing a damped flow through the third conduit in response to a second suspension condition. A fourth pair of the first fluid chambers other than those paired by the first, second and third conduits are interconnected by a fourth conduit. A fourth control arrangement is provided in the fourth conduit for precluding fluid flow through the fourth conduit in response to a first suspension condition and for providing a damped flow through the fourth conduit in response to a second suspension condition.

Another feature of the invention is embodied in an accumulator and control device for interconnection between four hydraulic damping units for controlling their respective damping action. The device comprises a housing defining first, second, third and fourth fluid chambers each adapted to exchange fluid with a respective one of said damping units. First, second, third and fourth accumulator pistons are each received in a respective one of the fluid chambers. The pistons and fluid chambers each define a fluid side for exchanging hydraulic fluid with the respective hydraulic damping unit and an accumulator side for maintaining a pressure in the hydraulic fluid. Four conduits each having a flow control therein interconnect different pairs of the fluid chambers and control the flow therebetween.

DETAILED DESCRIPTION

Figure 1:
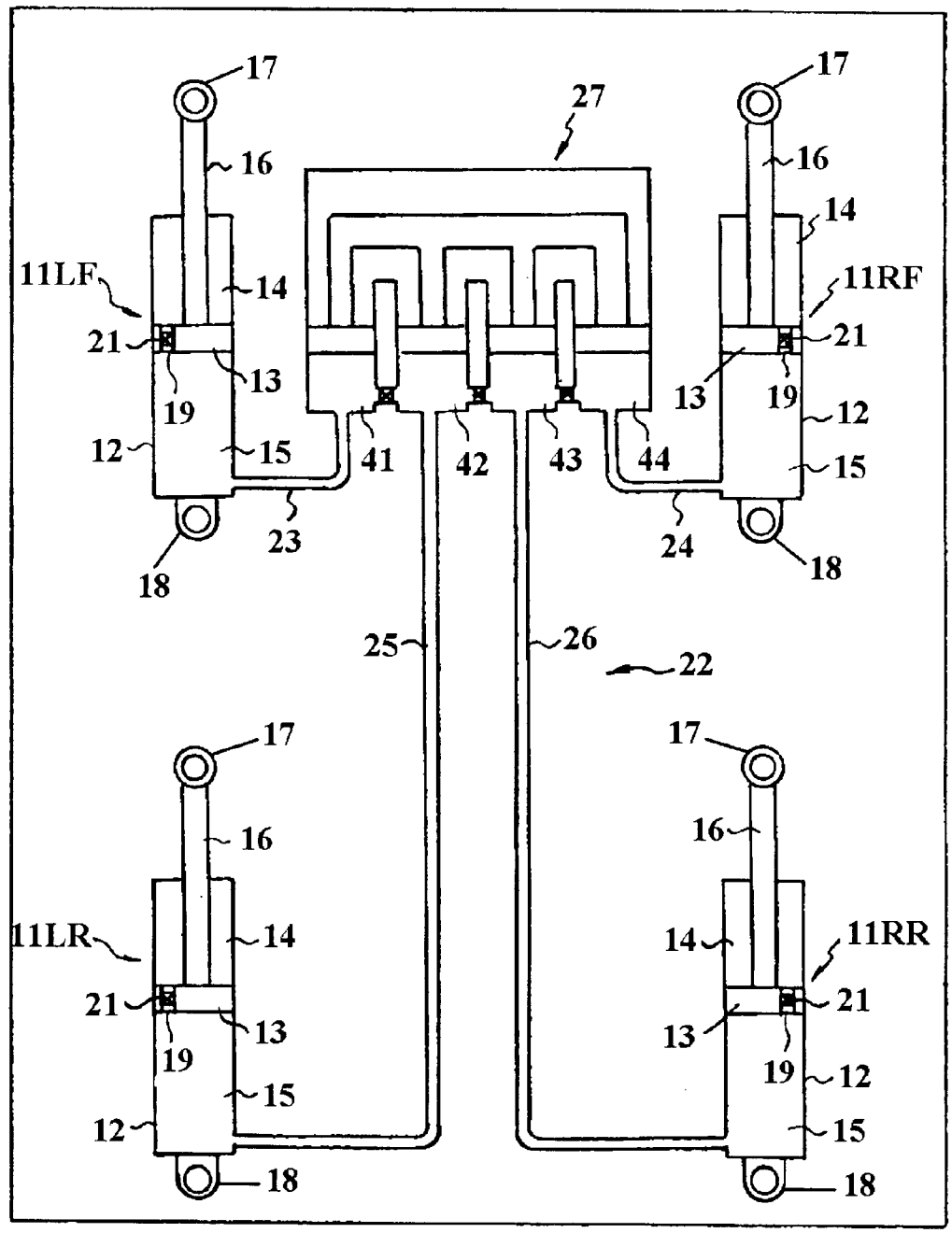
FIG. 1 is a partially schematic view of a prior art type of vehicle suspension system.
Figure 2:
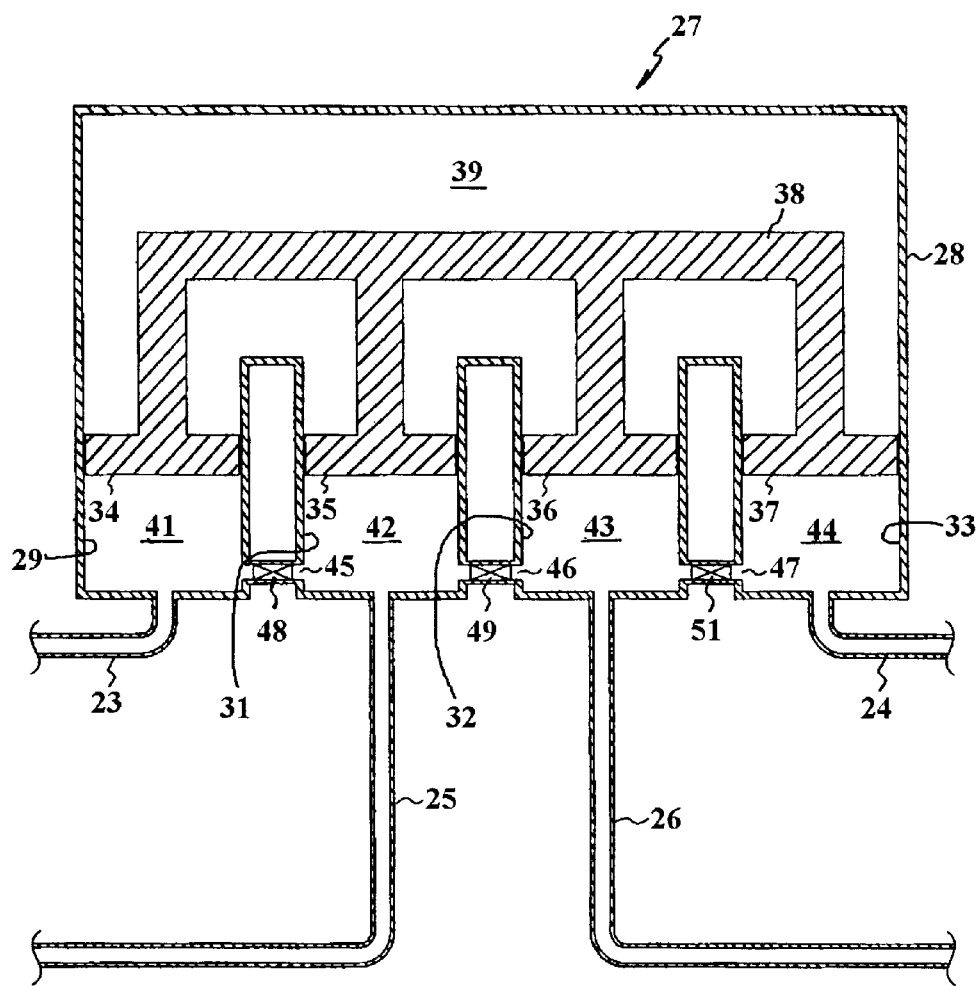
FIG. 2 is an enlarged cross sectional view showing the control damping arrangement for this prior art type of construction.
Figure 3:
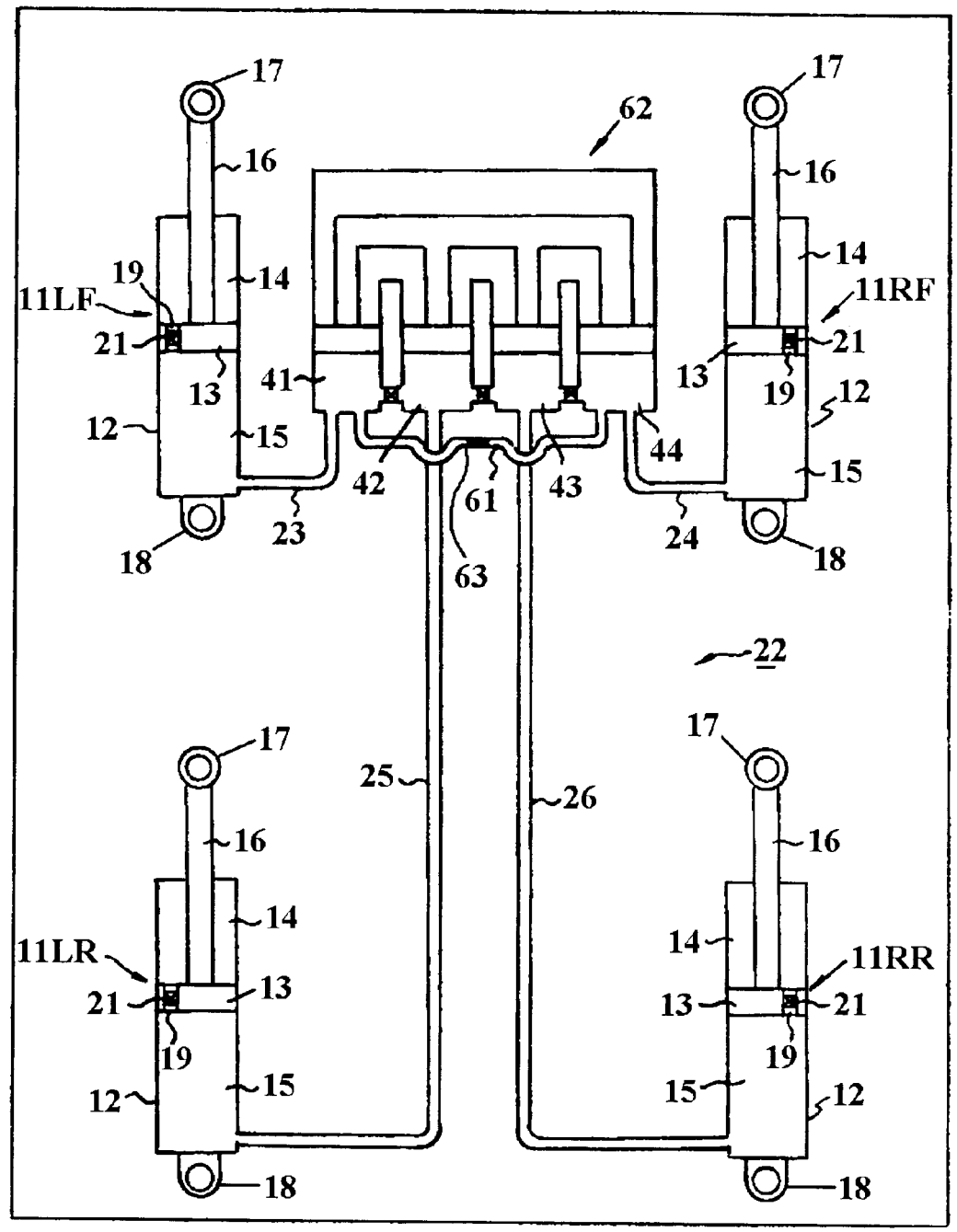
FIG. 3 is a schematic view, in part similar to FIG. 1, but showing a first embodiment of the invention.
Figure 4:
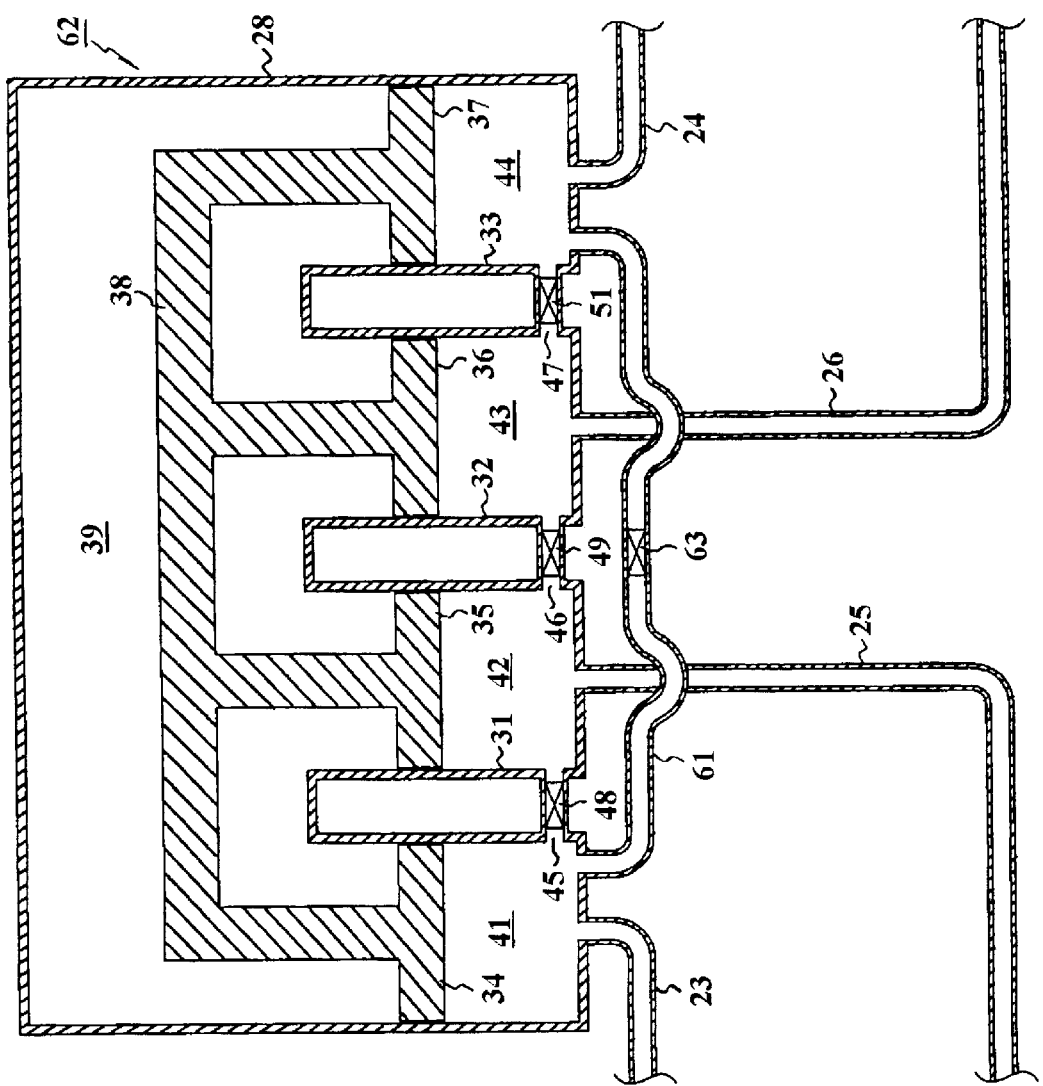
FIG. 4 is an enlarged cross sectional view, in part similar to FIG. 2, but shows the damping control arrangement for this embodiment.

Referring first to the embodiment of FIGS. 3 and 4, this embodiment employs components, which are generally similar to those of the prior art type of construction as illustrated in FIGS. 1 and 2, respectively. Therefore, when these similar components are described in conjunction with this embodiment, the same references numerals will be utilized to identify the components and those components will only be described further only insofar as is necessary to understand the construction and operation of this embodiment.

As has been noted in the section entitled "BACKGROUND OF INVENTION", the disadvantage with the prior art constructions is that there is no interconnection and damping arrangement between the chambers 15 of the two front shock absorbers 11LF and 11RF.

That problem is rectified in this embodiment by the provision of an interconnecting conduit 61, which is formed in the control member, indicated here by the reference numeral 62. The conduit 61 interconnects the chambers 41 and 44 associated with the front two shock absorbers 11LF and 11RF. In addition, there is a flow controlling orifice 63 in this conduit 61.

Hence, when the vehicle is rounding a curve and there is a tendency for body roll to occur, the flow between the chambers 41 and 44 is possible and this flow is restricted by the orifice 63. Thus, in combination with the rear damping orifice 49, there will be similar damping at both the front and rear wheels. This facilitates not only the handling of the leaning when negotiating curve but also makes the internal damping arrangement for each wheel simpler, thus avoiding the problems in the prior art type of construction.

Figure 5:
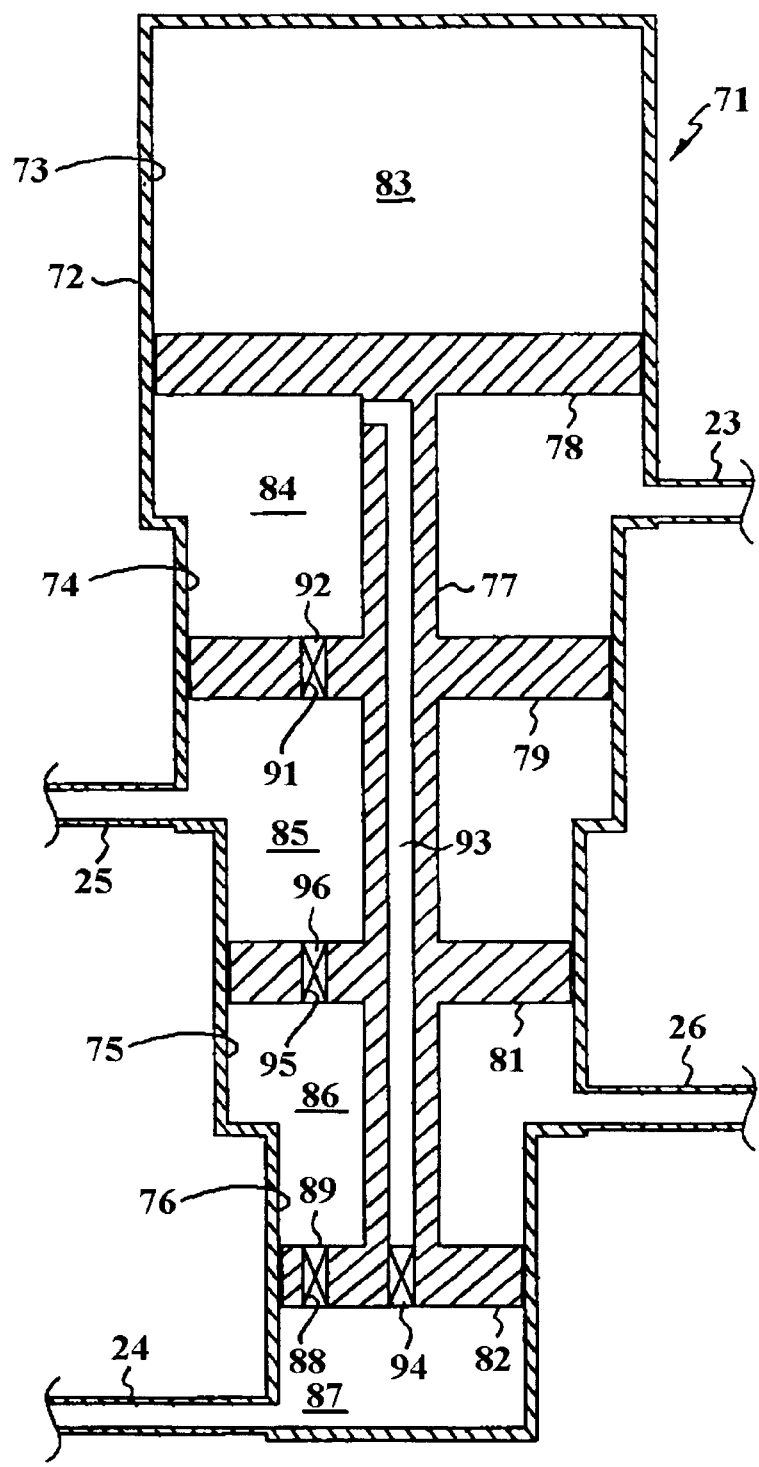
FIG. 5 is an enlarged cross sectional view, in part similar to FIG. 4, and shows a second embodiment of the invention.

FIG. 5 shows another embodiment of the invention which is generally similar to the embodiment of FIGS. 3 and 4 but which provides a more compact construction. In the embodiments of FIGS. 3 and 4, the chambers 41, 42, 43 and 44 have all been positioned in side-by-side relationship and this provides a rather long assembly. In this embodiment, the control member, indicated generally by the reference numeral 71 has an outer housing 72 that defines four stepped bores comprised of a first bore 73, a second bore of slightly smaller diameter 74, a third bore of still further smaller diameter 75 and a final bore 76 of a yet further smaller diameter.

An integral piston assembly is contained in the housing 72. This piston assembly is comprised of a piston rod 77 that integrally connects stepped pistons 78, 79, 81 and 82, that are received in the bores 73, 74, 75 and 76, respectively.

The upper piston 78 divides the construction into a first cylindrical chamber 83, which constitutes an accumulator chamber that is charged with an inert gas such as nitrogen under pressure. Below this is formed a first fluid chamber 84 which has an effective cross sectional area 84a equal to the area of the piston 78 less the area of the piston 79 and the piston rod 77. This effective area is equal to the effective cross sectional area 85a of a second fluid chamber 85 formed between the pistons 79 and 81. This effective area 85a is equal to the area of the piston 79 less the effective area of the piston 81. The underside of the piston 81 defines a third fluid chamber 86, which has an effective area 86a equal to the area of the piston 81 less the effective area of the piston 82. Finally, the underside of the piston 82 defines a final volume 87 which has an effective area 87a equivalent to its cross sectional area less that of the piston rod 77. That is:

$84a=85a=86a=87a$

The conduits 24 and 26 from the right front and rear shock absorbers 11 RF and 11 RR extend to the chambers 87 and 86, respectively. Damping between these chambers is provided by a flow passage 88 in which an orifice 89 is positioned.

The left shock absorbers and specifically the front and rear ones thereof 11LF and 11LR communicate via the conduits 23 and 25 with the chambers 84 and 85, respectively.

Damping between these two chambers 84 and 85 is provided by a flow passage 91 that extends through the piston portion 79 and in which a flow controlling orifice 92 is positioned. The chamber 84 is connected with the chamber 87 by means of a conduit 93 in which a flow controlling orifice 94 is provided. This provides left to right damping against leaning at the front. Leaning at the rear is dampened by flow through an passage 95 in the piston 81 in which an orifice 96 is positioned.

Figure 6:
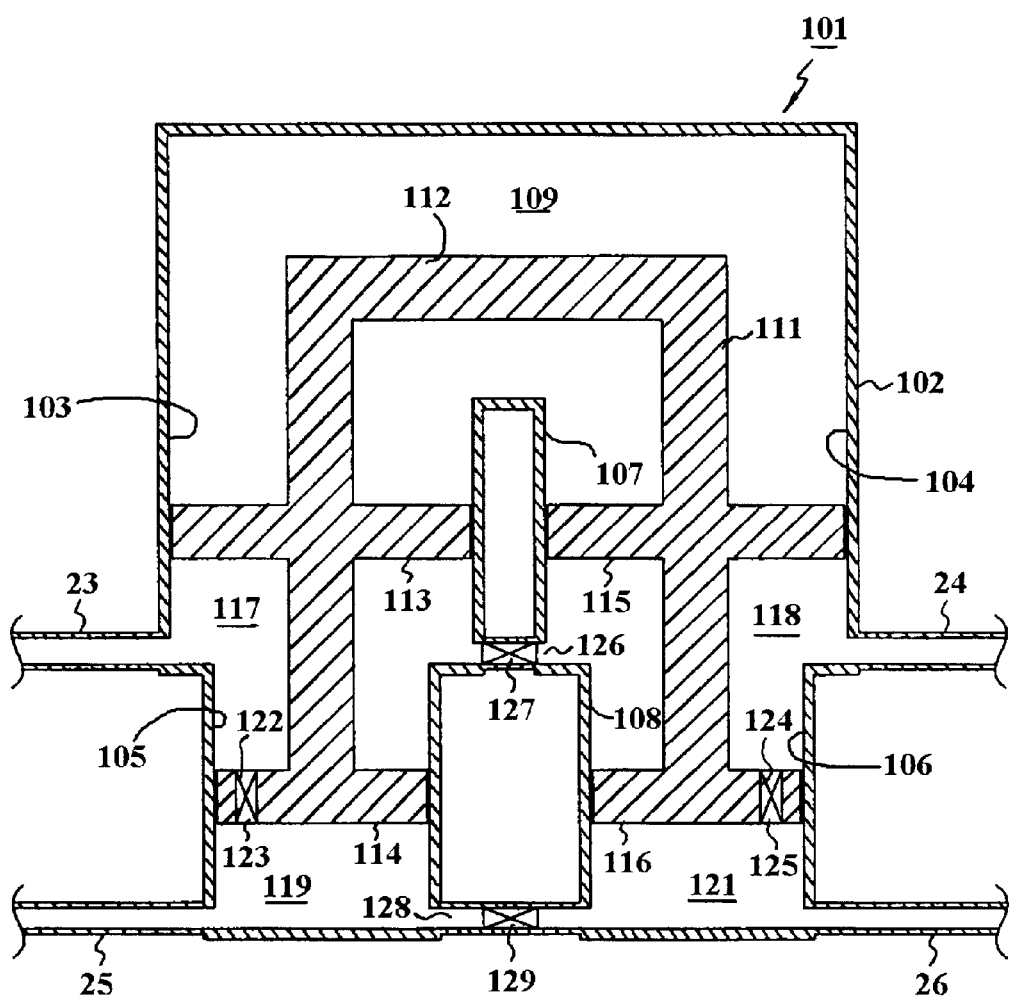
FIG. 6 is a cross sectional view, in part similar to FIGS. 4 and 5, and shows a third embodiment of the invention.

FIG. 6 shows another embodiment of the invention and is in part similar to FIG. 5 in that it does not show the individual shock absorbers but merely their interconnecting conduits 23, 24, 25 and 26. In this embodiment, a pressure control 101 is provided to achieve the same results as with the previously described embodiment.

The pressure control 101 includes an outer housing 102 which defines a pair of upper and lower cylinder bores comprised of an upper left hand bore portion 103 and an upper right hand bore portion 104. Below these upper bore portions 103 and 104 are provided smaller diameter, lower bore portions 105 and 106. The area above an internal, stepped dividing wall having an upper portion 107 and a lower portion 108 forms an accumulator chamber above the bores 103 and 104. This accumulator chamber is indicated by the reference numeral 109. A stepped piston assembly 111 having a pair of piston portions is interconnected by a bridging member 112 that extends into the accumulator chamber 109.

The piston assembly 111 is formed with respective left side pistons 113 and 114 that extend into the left hand bore portions 103 and 105. Also the piston assembly 111 has right hand pistons 115 and 116 that extend into the right hand bore portions 104 and 106.

Thus, there are defined four fluid chambers comprised of an upper left hand fluid chamber 117, an upper right hand chamber 118, a lower left hand chamber 119 and a lower right hand chamber 121. As with the previously described embodiments, the effective areas of the piston portions 113, 114, 118 and 121 in the bores 117, 119, 118 and 112, respectively, are all equal.

The left front shock absorber 11LF communicates with the chamber 117 through the conduit 23 while the right front shock absorber 11RF communicates with the right hand upper chamber 118 through the conduit 24. The left and right rear shock absorbers communicate with the chambers 119 and 121, respectively via the conduits 25 and 26.

A passageway 122 through the piston portion 114 is provided with an orifice 123, which dampens front to rear pitching and squat motions at the left side of the vehicle. Similar motions at the right side of the vehicle are damped by a flow passage 124 in which a flow controlling orifice 125 in the piston 116.

Left to right roll at the front is controlled by a passageway 126 that extends through the dividing wall portions 107 and 108 at their juncture and in which a flow controlling orifice 127 is provided. Similar dampening at the rear is provided by a flow passage 128 that extends between the chambers 119 and 121 and which a flow controlling orifice 129 is provided. Hence, with this embodiment, the damping front to rear and side-to-side is provided equally at the front and rear and left and right sides of the vehicle.

Figure 7:
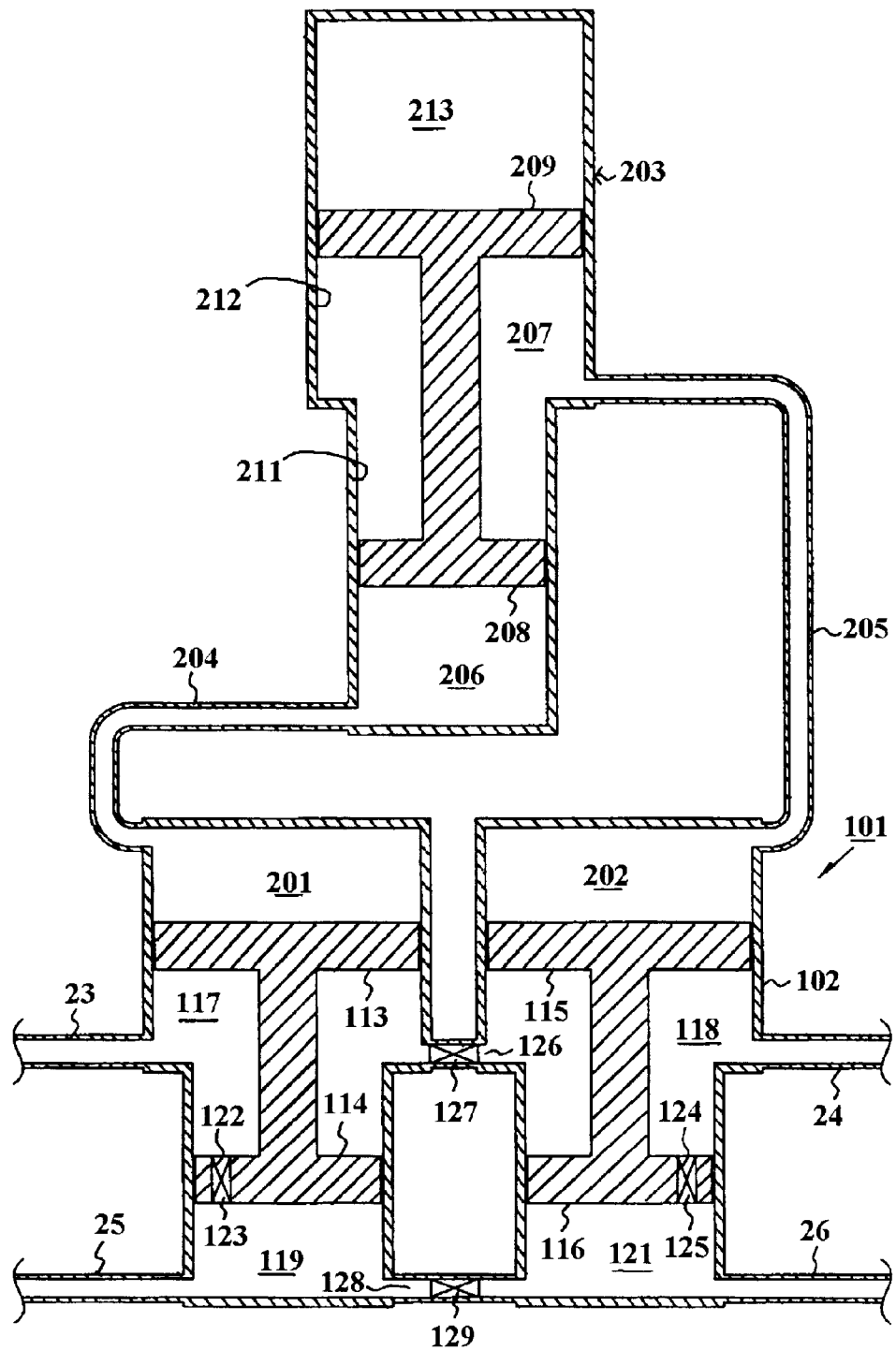
FIG. 7 is a cross sectional view, in part similar to FIGS. 4, 5 and 6, and shows a fourth embodiment of the invention.

FIG. 7 shows a yet further embodiment, which in some ways is quite similar to that of FIG. 6 and, therefore, where components of this embodiment are the same as that embodiment or substantially the same, they have been identified by the same reference numerals and will described again only insofar as is necessary to understand the invention. in this embodiment, the two pairs of pistons 113 and 114 and 115 and 116 rather than being integrally connected to each other by the bridging portion 112 are hydraulically connected to each other. Hence, it is possible to mount the components in spaced apart locations. Because the piston portions 113 and 114 and 115 and 116 are separate from each other and not mechanically interconnected, it is not necessary that they be disposed in the same housing.

However, in whatever housing they are supported, there is provided a pair of further fluid chambers 201 and 202 formed above the chambers 117 and 118, respectively. These chambers are in fluid communication with an accumulator device, indicated generally by the reference numeral 203 and which also can be separately located because of the lack of mechanical interconnection.

Fluid interconnection is provided by means of a pair of conduits 204 and 205 that extend from a pair of equal effective area fluid chambers 206 and 207, respectively, formed in the housing 203. A piston having first and second portions 208 and 209 is received in bore portions 211 and 212 respectively thereof. An incompressible fluid such as an oil is contained in the chambers 206 and 207, conduits 204 and 105 and chambers 201 and 202 so as to insure uniform movement there between.

The area above the piston 209 is filled with an inert gas under pressure in a chamber indicated by the reference numeral 213 so as to accommodate for the difference in piston rod displacements and to insure good control. Thus, since this embodiment operates the same as that previously described, further description of it is not believed to be necessary to permit those skilled in the art to practice the invention.

Thus from the foregoing described and preferred embodiments, it should be apparent that a highly effective and yet quite simple four wheel vehicle suspension system is possible that effectively dampens all types of expected loadings. Of course these embodiments are only preferred embodiments and various changes and modifications are possible without departing from the spirit and scope of the invention as set out in the appended claims.

What is claimed is:

1. A suspension system for a vehicle having at least four wheels, each supported for suspension movement by a vehicle body, four damping elements each having a pair of relatively moveable members defining a respective first fluid chamber and interposed between a respective one of said wheels and said vehicle body for varying the volume of said first fluid chamber upon suspension movement of said respective one wheel, each of said damping elements having a respective first damping arrangement for damping the flow of fluid from the respective one of said first fluid chambers, a first conduit interconnecting a first pair of said first fluid chambers of two of said damping elements, a first control arrangement including a first flow controlling orifice for precluding fluid flow through said first conduit in response to a first suspension condition and for providing a damped flow through said first conduit in response to a second suspension condition, a second conduit interconnecting the second pair of said first fluid chambers of the remaining two of said damping elements, a second control arrangement including a second flow controlling orifice in said second conduit for precluding fluid flow through said second conduit in response to a first suspension condition and for providing a damped flow through said second conduit in response to a second suspension condition, a third conduit interconnecting a third pair of said first fluid chambers other than those paired by said first and said second conduits, a third control arrangement including a third flow controlling orifice in said third conduit for precluding fluid flaw through said third conduit in response to a first suspension condition and for providing a damped flow through said third conduit in response to a second suspension condition, a forth conduit interconnecting a fourth pair of said first fluid chambers other than those paired by said first, said second and said third conduits, and a fourth control arrangement in said fourth conduit including a fourth flow controlling orifice for precluding fluid flow through said fourth conduit in response to a first suspension condition and for providing a damped flow through said fourth conduit in response to a second suspension condition, at least a portion of the fluid disc laced from the first of the chambers of the respective damping element is displaced to an accumulator chamber associated with the respective damping element and forming at least portion of each control arrangement, there being a plurality of accumulator chambers each having a respective accumulator piston, said accumulator pistons being interconnected to each other for simultaneous movement for maintaining the same fluid displacement for each accumulator chamber upon the displacement of fluid from the first fluid chamber of the respective damping element.

2. A suspension system as set forth in claim 1, wherein the first suspension conditions are conditions wherein the same amount of fluid is displaced from both of the first fluid chambers paired by the respective conduit at substantially the same time.

3. A suspension system as set forth in claim 2, where the second suspension conditions is a condition wherein there is an unequal load on the damping elements paired by the respective conduit at the same time.

4. A suspension system as set forth in claim 1, wherein the relatively moveable members of each damping element each define a second fluid chamber and wherein the fluid flow from the first chambers of each damping element flows at least in part to the second chamber of the respective damping element.

5. A suspension system as set forth in claim 4, wherein the first suspension conditions are conditions wherein the same amount of fluid is displaced from both of the first fluid chambers paired by the respective conduit at substantially the same time.

6. A suspension system as set forth in claim 5, where the second suspension conditions is a condition wherein there is an unequal load on the damping elements paired by the respective conduit at the same time.

7. A suspension system as set forth in claim 1, wherein each of the conduits and respective flow controlling orifice permits damped flow between the paired damping element chambers in response to the unequal displacement of fluid from the first fluid chambers of the paired damping elements under certain types of loading.

8. A suspension system as set forth in claim 1, wherein the accumulator chambers comprising a housing defining first, second, third and fourth fluid chambers each adapted to exchange fluid with a respectively one of said damping units, first, second, third and fourth accumulator pistons each received in a respective one of said fluid chambers and defining a fluid side for exchanging hydraulic fluid with the respective hydraulic damping unit and a gas pressure side receiving a pressurized gas for maintaining a pressure in said hydraulic fluid, and the conduits interconnect different pairs of said fluid chambers and control the flow therebetween.

9. A suspension system as set forth in claim 8, wherein each of the conduits permits damped flow between the paired damping element chambers in response to the unequal displacement of fluid from the first fluid chambers of the paired damping elements under certain types of loading.

10. A suspension system as set forth in claim 9, wherein the accumulator chambers all have a common gas pressure side.

11. A suspension system as set forth in claim 9, wherein the accumulator chambers and accumulator piston are all arranged in side by side condition with the reciprocal axes of said accumulator pistons being parallel to each other.

12. A suspension system as set to in claim 11, wherein three of the conduits extend between respective, adjacent accumulator chamber and sides and the remaining conduit extends between the opposite end accumulator chamber fluid sides.

13. A suspension system as set forth in claim 12, wherein the accumulator chambers all have a common gas pressure side.

14. A suspension system as set forth in claim 8, wherein the accumulator pistons are comprised of concentric pistons, one comprising a cylindrical piston and the others comprising an annular pistons integrally connected to each other and to the cylindrical piston.

15. A suspension system as set forth in claim 14, wherein the housing defines a coaxial bores each receiving a respective one of the cylindrical and concentric pistons.

16. A suspension system as set forth in claim 15, wherein the conduits are all formed in the pistons.

17. A suspension system as set forth in claim 16, wherein three of the conduits are formed directly in the fluid pressure receiving surfaces of the pistons and the remaining conduit extends through an interconnecting portion of the pistons between the end most accumulator chamber fluid sides.

18. A suspension system as set forth in claim 17, wherein the side of one of the end most pistons opposite its fluid side forms the gas pressure side for all of the pistons.

19. An accumulator and control device for interconnection between four hydraulic damping units for controlling their respective damping action comprising a housing defining first, second, third and fourth fluid chambers each adapted to exchange fluid with a respective one of said damping units, first, second, third and fourth accumulator pistons each received in a respective one of said fluid chambers and defining a fluid side for exchanging hydraulic fluid with the respective hydraulic damping unit and an accumulator side for maintaining a pressure in said hydraulic fluid, and four conduits each having a respective flow controlling orifice therein for interconnecting different pairs of said fluid chambers and for controlling the flow therebetween.

20. An accumulator and control device as set forth in claim 19, wherein the accumulator pistons have the same effective cross-sectional area.

21. An accumulator and control device as set forth in claim 20, wherein the accumulator pistons are all interconnected with each other for simultaneous movement for equal displacement of fluid between the hydraulic damping units.

22. An accumulator and control device as set forth in claim 21, wherein the fluid chambers are disposed in side-by-side relationship to each other and the means for interconnecting the accumulator pistons comprises a cross bar extending between the pistons.

23. An accumulator and control device as set forth in claim 22, wherein the fluid chambers comprise side-by-side cylinder bores and the interconnecting cross bar extends through the gas pressure side.

24. An accumulator and control device as set forth in claim 19, wherein at least two of the pistons are pistons integrally connected with each other.

25. An accumulator and control device as set forth in claim 24, wherein the accumulator chamber is formed by an outer housing having at least a first smaller diameter cylindrical bore portion one of the connected pistons and a second larger diameter portion receiving another of the pistons.

* * * * *